(12) United States Patent
Bopardikar et al.

(10) Patent No.: US 6,654,855 B1
(45) Date of Patent: Nov. 25, 2003

(54) METHOD AND APPARATUS FOR IMPROVING THE EFFICIENCY OF CACHE MEMORIES USING CHAINED METRICS

(75) Inventors: Raju C. Bopardikar, Carlisle, MA (US); Jack J. Stiffler, Marion, MA (US)

(73) Assignee: EMC Corporation, Hopkinton, MA (US)

( * ) Notice: Subject to any disclaimer, the term of this patent is extended or adjusted under 35 U.S.C. 154(b) by 74 days.

(21) Appl. No.: 09/804,372

(22) Filed: Mar. 12, 2001

Related U.S. Application Data
(60) Provisional application No. 60/243,318, filed on Oct. 26, 2000.

(51) Int. Cl.[7] .................................................. G06F 12/00
(52) U.S. Cl. ..................... 711/133; 711/118; 711/134; 711/136; 711/159; 711/160
(58) Field of Search ................................. 711/133, 134, 711/118, 136, 159, 160

(56) References Cited

U.S. PATENT DOCUMENTS

| | | | | |
|---|---|---|---|---|
| 5,043,885 A | * | 8/1991 | Robinson | 711/133 |
| 5,481,691 A | * | 1/1996 | Day, et al. | 711/133 |
| 5,668,972 A | * | 9/1997 | Liu et al. | 711/136 |
| 6,088,767 A | | 7/2000 | Dan et al. | |
| 6,385,699 B1 | * | 5/2002 | Bozman et al. | 711/133 |
| 6,397,298 B1 | * | 5/2002 | Arimilli et al. | 711/128 |

FOREIGN PATENT DOCUMENTS

| | | |
|---|---|---|
| EP | 0 412 245 A2 | 8/1989 |
| EP | 0 469 202 A1 | 2/1992 |

* cited by examiner

*Primary Examiner*—Donald Sparks
*Assistant Examiner*—Ngoc Dinh
(74) *Attorney, Agent, or Firm*—Kudirka & Jobse, LLP (57) ABSTRACT

A time-weighted metric is associated with each line of data that is being held in a data cache. The value of the metric is recomputed as the lines are accessed and the metric value is used to group cache lines for paging purposes. The metrics are computed and stored and the stored metrics are maintained by linking the storage locations together in several linked lists that allow the metrics to be easily manipulated for updating purposes and for determining which metrics represent the most active cache lines. In particular, indices are maintained which identify linked lists of metrics with similar values. At regular predetermined time intervals, these indices are then used to assemble an ordered linked list of metrics corresponding to cache lines with similar metric values. This ordered list can be traversed in order to select cache lines for removal.

30 Claims, 5 Drawing Sheets

METHOD AND APPARATUS FOR IMPROVING THE EFFICIENCY OF CACHE MEMORIES USING CHAINED METRICS

RELATED APPLICATIONS

This application is related to, and claims priority under 35 U.S.C. §119(e) of, U.S. provisional patent application, Ser. No. 60/243,318, filed Oct. 26, 2000 by Raju C. Bopardikar and Jack J. Stiffler.

FIELD OF THE INVENTION

This invention relates to data processing and storage systems and more particularly to cache memory storage used in such systems.

BACKGROUND OF THE INVENTION

Data caching is used in virtually all systems in which information is transferred from one place to another. For example, computers constantly move data back and forth between different storage media (tapes, disks, main memory, cache memory) in accordance with the usage patterns of the data. Large capacity, relatively slow, media are used to store data that is not, and is not expected to be, of current interest. When such data is requested, it is moved from the slow media to a faster, more expensive and, consequently, more limited in capacity, medium. This process is called data caching and the use of a faster medium produces performance gains under the generally valid assumption that, once data has been accessed, it will be accessed repeatedly. This process often continues through several levels of storage hierarchy, with smaller portions of data moved into successively faster media in an attempt to reflect anticipated usage.

Since typically only a small fraction of the data kept at one level of the storage hierarchy can be held at the next higher level, and since, when new data is requested and hence moved to that higher level, other data must be moved back to the lower level to make room for this new data, the decision as to what data should be removed and what should be retained in the storage media of a given level is critical to the efficiencies to be gained from caching data in the first place.

The prior art has addressed the decision as to what data should be removed and what should be retained in the storage media of a given level in one of three ways: (1) deterministic replacement in which some deterministic algorithm, not based on any access pattern, is used to identify the data page to be removed; (2) random replacement, in which the page to be removed is selected using some pseudo-random process; and (3) least-recently-used (LRU) replacement in which the page that has been least recently accessed is selected for removal.

The relative ineffectiveness of either of the first two of these procedures is obvious. The LRU method, while considerably better than the other two alternatives, suffers from the fact that a heavily used, but temporarily inactive, data page can be, and frequently is, removed in deference to a more recently accessed page that is rarely used.

A related issue is the amount of data that is transferred from higher level storage to a lower level when new data is requested. This amount of data is usually referred to as a cache "page." Generally, the slower the media, the larger the cache page that is transferred to be cached at the next higher level for reasons having to do with the relationship between the time needed to access the first data element in the page and the time needed to transfer subsequent data elements in that page once the first element has been accessed. Once a page is stored on the lower level medium, it a request is made for any data on that page, the entire page is transferred back from the lower level storage to the cache memory.

While the optimum cache page size is largely a function of the medium storage speed at the storage level immediately below the cache memory, the structure of the data within a page strongly affects the likelihood that all or most of the data on that page will be subsequently required. Ideally, data that is transferred in each cache page should be highly correlated in the sense that, if some of the data is needed, then most likely much of the rest of that data on the page will also be needed. This is, in fact, often the case. For example, files stored on disk storage are frequently considerably larger than the pages into which these files are partitioned for storage purposes. File systems often take advantage of this fact by anticipating that pages adjacent to the just requested page are going to be subsequently requested. The file systems then transfer these adjacent pages to higher-level storage before they are actually requested.

However, in many cases, the opposite is true; the size of the data structures being stored (often referred to as cache "lines") is small compared the size of the page into which they are grouped. In this event, only a portion of the transferred data page may actually be accessed with the rest taking up valuable cache memory space that could more profitably be used for other data structures. Even so, there may exist hidden correlations among these data structures that can only be discerned by observing their access patterns; that is, if two apparently independent data structures tend to be accessed at roughly the same time with roughly the same frequency, they may be correlated. When this is the case, caching efficiencies can obviously be gained by grouping these correlated structures into the same cache page for storage.

One important example in which the data structures of interest are generally small compared to the pages into which they are grouped for storage purposes are data structures for storing file system "metadata", that is, information describing the attributes of the various files and directories comprising a file system. Cache pages meant for disk storage typically contain of the order of eight to sixteen metadata data structures. These structures tend to be grouped into pages based, for example, on the names of their associated files or directories, or on the chronological order in which they were created. Consequently, they are unlikely to be correlated.

Grouping of data structures for paging purposes has been largely ignored in the prior art, possibly because most data structures do exceed the size of a single page so the data elements within a page are naturally correlated. As noted, however, there are important exceptions to this rule that can significantly affect the efficiency with which such data structures are cached.

Therefore, there exists a need for a method and apparatus for determining which cache lines to remove from the cache memory in order to make room for new data and for grouping correlated data into pages in order to permit efficient caching of the data.

SUMMARY OF THE INVENTION

In accordance with the principles of the invention, a time-weighted metric is associated with each cache line that is being held in a data cache. The value of the metric is re-computed as the lines are accessed and the metric value is used to group cache lines for paging purposes. The use of the metrics increases the likelihood that the most active lines are held in the cache so long as they remain active.

The metrics are computed and stored and the stored metrics are maintained by linking the storage locations together in several linked lists that allow the metrics to be easily manipulated for updating purposes and for determining which metrics represent the most active cache lines.

In accordance with one embodiment, the operation of the cache memory to is broken into time intervals, each interval having a predetermined duration. An ordered linked list is maintained of the time-weighted metrics associated with the cache lines. This ordered linked list consists of a connected set of sub-chains, wherein the sub-chains are linked in order of the time duration in which their entries were last accessed and the entries within each sub-chain are ordered in accordance with their associated metrics. One or more separate lists are used to group the entries accessed during a by time interval according to their metrics, with any two entries having the same metric ordered most-recently-accessed first. In particular, the sub-chains are indexed by these lists. When a time interval ends, all the chains indexed in the lists are linked together in the order of their metrics and placed at the top of the ordered linked list.

In accordance with another embodiment, the ordered linked list is traversed in order to determine which cache lines to remove when additional space is needed in the cache memory.

BRIEF DESCRIPTION OF THE DRAWINGS

The above and further advantages of the invention may be better understood by referring to the following description in conjunction with the accompanying drawings in which.

DETAILED DESCRIPTION

Figure 1:
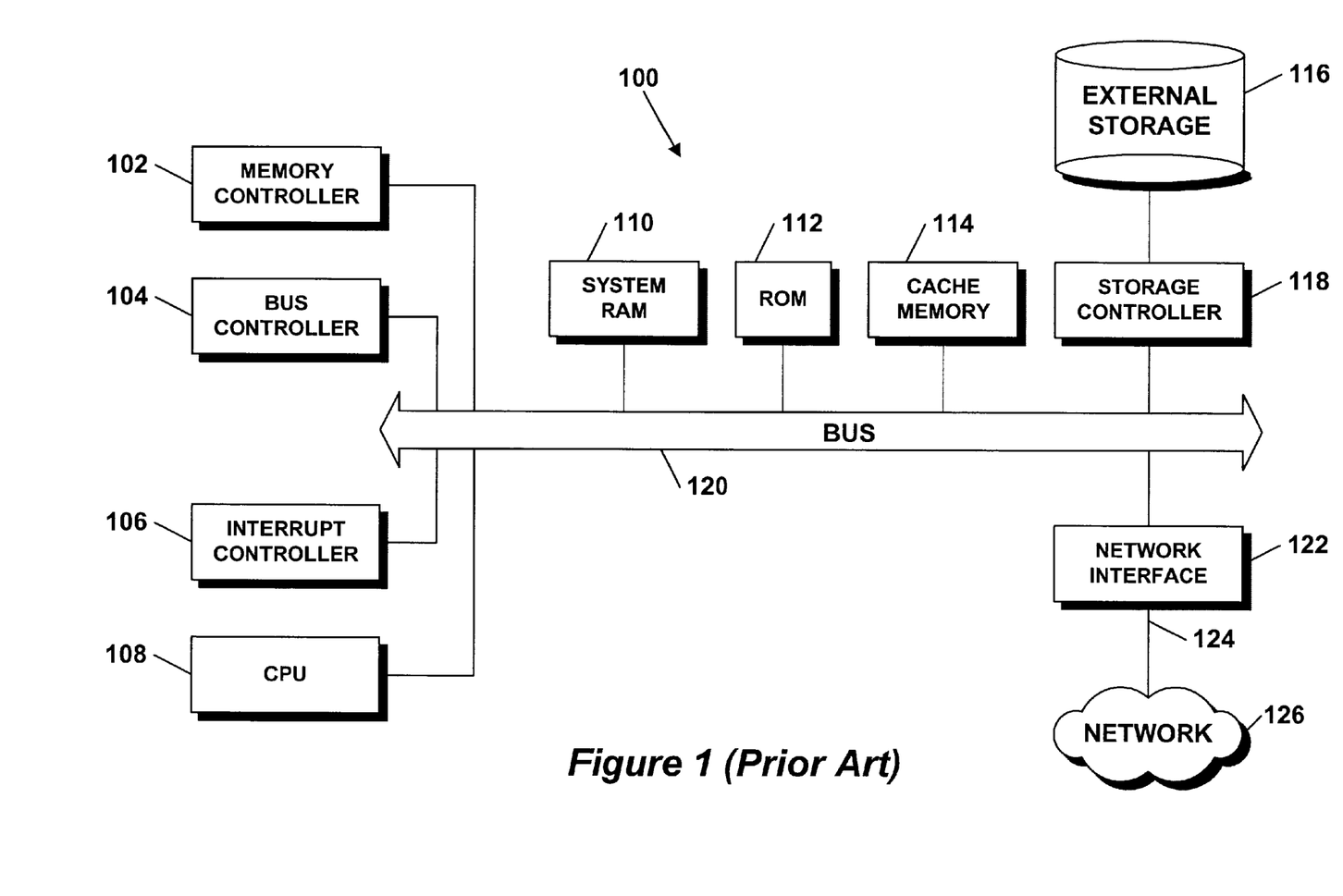
FIG. 1 is a block schematic diagram illustrating a computer system with a hierarchical memory system including a cache memory.

FIG. 1 illustrates, in a schematic form, the system architecture for an exemplary computer system 100, on which the disclosed cache memory paging system can be implemented. The exemplary computer system of FIG. 1 is discussed only for descriptive purposes, however, and should not be considered a limitation of the invention. Although the description below may refer to terms commonly used in describing particular computer systems, the described concepts apply equally to other computer systems, including systems having architectures that are dissimilar to that shown in FIG. 1. Features that are common to conventional computer systems and that are not directly involved in the operation of the cache memory system, such as display and I/O devices including keyboards and mice, have been omitted for clarity.

The computer 100 includes a central processing unit 108, which may include a conventional microprocessor, a random access memory (RAM) 110 for working storage of information and a cache memory 114 for temporarily storing information that is transferred between system RAM 110 and external storage. A memory controller 102 is provided for controlling system RAM 110 and cache memory 114. A bus controller 104 is provided for controlling bus 120, and an interrupt controller 106 is used for receiving and processing various interrupt signals from the other system components.

External mass storage may be provided by external storage device 116 that is connected to bus 120 by storage controller 118. Computer system 100 also includes a network interface 122 that allows the computer 100 to be interconnected to a network 126 via a bus 124. The network 126, which may be a local area network (LAN), a wide area network (WAN), or the Internet, may utilize general-purpose communication lines that interconnect multiple network devices.

In the following discussion, the term "page" is used to denote the entities that are moved back and forth between the cache memory 114 and the next lower level in the memory hierarchy (for example, the external storage 116 in FIG. 1) and the term "line" is used for entities that are known to consist of correlated data elements. For example, in the case of file system metadata, the metadata pertaining to a single file or directory constitutes a cache line. It is assumed that pages have a fixed size p and lines have a fixed size s. As noted, in some cases, s may be equal to, or greater than, p, but in such cases, s and p will be equated for purposes of the present discussion. In this case, a cache memory constructed in accordance with the principles of the invention provides a superior mechanism for determining which pages to remove from the cache when making room for new pages. When s is smaller than p, in addition to determining which pages to remove from the cache memory, improved cache performance is obtained by grouping correlated lines into pages.

The assignment of a metric to each cached line is important to the ability of the inventive method and apparatus to identify the currently active lines and to group them appropriately. The preferred metric, and the one that is assumed in the following discussion, is the line access count (acc_count). This count is the number of times a particular line has been accessed since it was brought into cache. It is assumed that the metrics are numbers in the range $\{0, N-1\}$, so if the access count reaches $N-1$, it remains at that count regardless of the number of additional accesses made to its associated line. Other metrics are possible within the scope of this invention; some alternative metrics are discussed below.

Figure 2:
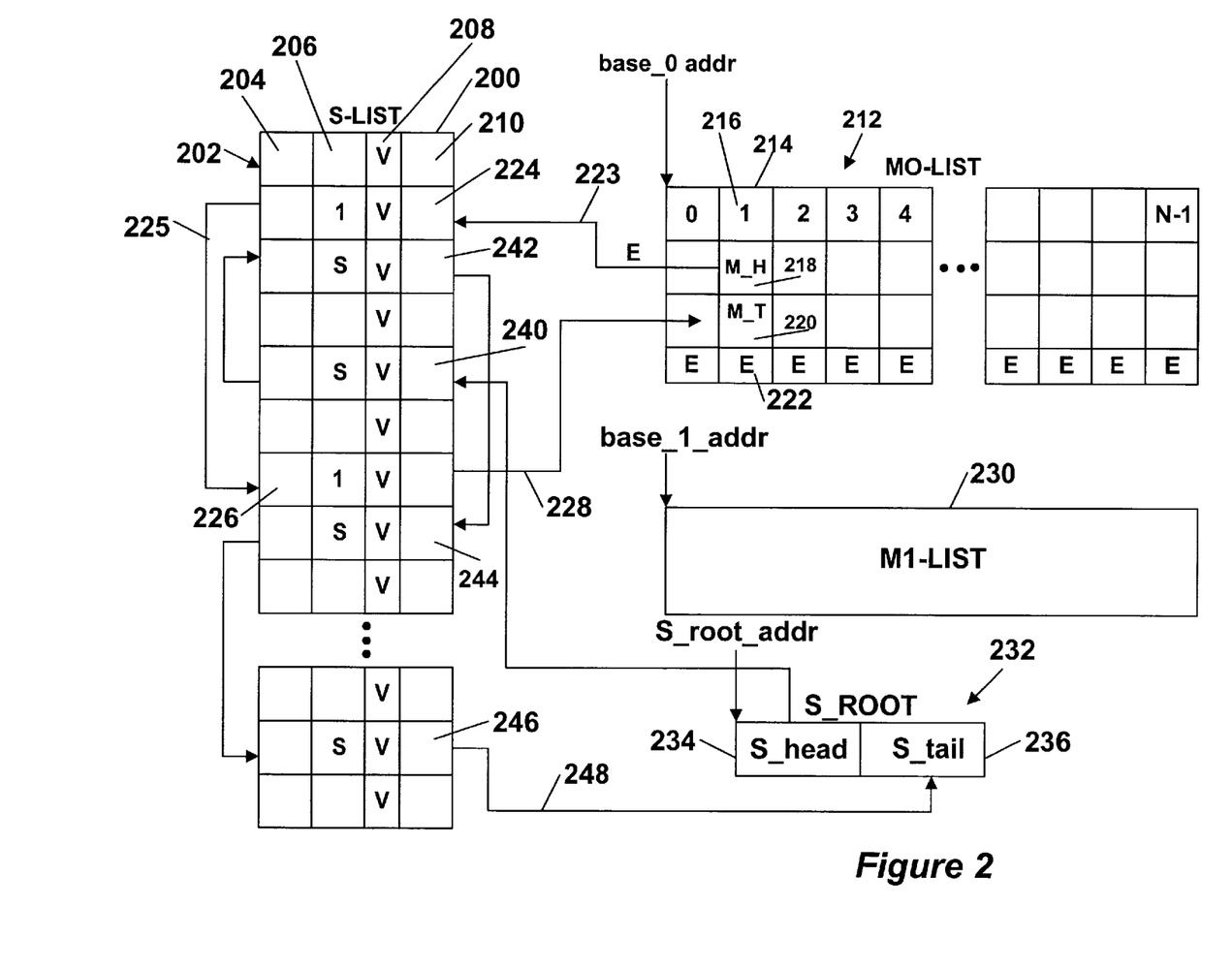
FIG. 2 is a schematic diagram that shows illustrative linked lists used in accordance with the principles of the invention.

Implementation of the present invention entails the maintenance of four data structures. These structures are accessed with roughly the same frequency as the cache with which they are associated and therefore should have access characteristics comparable to that of the cache. In fact, they can be stored in the cache itself or in an auxiliary memory. The four structures are shown in FIG. 2 and are described as follows:

S-list list 200 has one entry, such as entry 202, for each line that can be contained in cache. The cache line address is used as an index to determine the S-list address (the S_addr). Each entry, such as entry 202, in the list contains: (1) a metric 206 attached to its associated line; (2) The address 204 of its predecessor in a linked list (the pred_addr); (3) The address 210 of its successor in a list (the sccr_addr) and (4) a bit 208 (a valid bit), indicating whether the S-list entry is associated with a non-empty or valid cache line or an empty or invalid cache line. (The valid bit could be omitted if, for example, the convention pred_addr= sccr_addr or some other convention were used instead to indicate an invalid cache line.)

M0-list List 212 contains one entry, such as entry 214, for each possible value of the metric; the address (M_root) of each entry is formed by adding the metric corresponding to that entry (i.e., the entry's index 216) to the base address (base_0_addr). Each entry, such as entry 214, is composed of: (1) the address 218 (M_head) of the S-list entry containing the first item in a doubly linked list of entries (an M-chain) having a metric equal to the entry's index; (2) the address 220 (M_tail) of the S-list entry containing the last item in the M-chain having a metric equal to the entry's index; and (3) a bit 222 (empty bit) indicating that there are no S-list entries associated with the entry's index. In FIG. 2, the M_head address 218 points, as indicated by arrow 223 to a two-entry M_chain comprising entries 224 and 226 which are linked as indicated by arrow 225. (They are also linked in the reverse direction by another pointer that is not shown.) The address of entry 226 is stored, as indicated by arrow 228, in the M_tail value 222 in entry 214.

M1-list the structure of list 230 is identical to that of the M0-list 212 with the address of each entry in the M1-list formed by adding the corresponding metric to the base address, base_1_addr. The M0-list 212 and the M1-list 230 will be referred to collectively as the M-list.

S-root This structure 232, located at the address S_root_addr, contains: (1) the address 234 (S_head) of the first entry in another linked list called the S-chain (i.e., the linked list of all valid S-list entries that are not part of an M-chain) and (2) the address 236 (S_tail) of the last entry in the S-chain. In FIG. 2, the S_head value points as indicated by arrow 238 to an S-chain comprised of entries 240, 242, 244 and 246. The address of entry 246 is stored, as indicated by arrow 248 in the value S-tail 236.

If an entry in the S-list is the first entry in an M-chain linked list, then its predecessor address is the address of one of the M-list entries. Similarly, if the entry is the first entry in the S-chain, its predecessor address is the address of the S-root. Similarly, if an entry is the last entry in an M-chain, then its successor address is one of the M-list entries. If the entry is the last entry in the S-chain, then its successor address is the address of the S-root.

The aforementioned data structures define 2N+1 doubly linked lists, some of which may be temporarily empty. Each of the up to N non-empty entries in the M0-list and each of the up to N non-empty entries in the M1-list contains the S-list addresses of the beginning and end of a linked list (an M-chain) of entries all having the same metric. All entries in the S-list that are not part of any other list are themselves doubly linked to form the 2N+1st linked list (the S-chain).

On each access made to a cache line, its associated S-list entry is linked is to an M-chain indexed by the entry's metric and rooted in either the M0-list or the M1-list The list receiving new entries is referred to as the "active M-list" and the other list the "inactive M-list". The selection of the active M-list is determined by the current time interval. Periodically, with a time period measured, for example, in time units or in the number of cache accesses, time is advanced to the next interval and the M0- and M1-list roles are reversed.

Whenever a new page is brought into the cache, an S-list entry is created for each of its cache lines. The cache lines are then assigned the metric 0, linked together and rooted in the active M-list. On each access made to a cache line that is already in the cache memory, the corresponding S-list entry is de-linked from whatever list it was linked to prior to that access, and, after its metric is incremented, it is linked to the list corresponding to that incremented metric and rooted in the active M-list.

In this arrangement, the S-chain is an ordered list of the time-weighted metrics associated with the cache lines. That is, the S-chain consists of a connected set of sub-chains, the sub-chains linked in order of the time duration in which their entries were last accessed and the entries within each sub-chain ordered in accordance with their associated metrics.

The function of the M-list is to group the entries accessed during any time interval according to their metrics, with any two entries having the same metric ordered most-recently-accessed first. When the time interval ends, all the chains rooted in the M-list are linked together in the order of their metrics and placed at the top of the S-chain. The reason for maintaining two M-lists is so that one list can be merged with the S-chain while the other continues to accept new entries, thereby eliminating the need to halt normal operation while the merge operation is taking place. Note that, since any cache line can be accessed at any time, any entry on the S-list belonging to either the S-chain or to any of the M-chains rooted in either of the M-lists can be moved at any time to a chain rooted in the active M-list. Consequently, any implementation must take this fact into account.

When a cache page needs to be removed to make room for a new page, its constituent lines are selected by starting at the bottom of the S-chain, with the least recently accessed entry having the smallest metric, and continuing upward until a full page has been assembled. This backward progression is possible because the S-chain list is doubly linked.

The procedure thus orders cache lines taking into account both the time of their last access and the total number of times they've been accessed since they were first brought into the cache and selects them for replacement accordingly. If the time intervals are very short (for example, equal to the time to access a single cache line), this procedure degenerates to the conventional least-recently-accessed replacement procedure with the number of accesses playing no role. At the other extreme, with the time interval infinite and the candidates for removal selected by default from the M-chains representing the smallest metrics, only the number of accesses influences the decision. Picking an intermediate time interval allows the decision to be based on a combination of the two measures. One interesting choice, for example, is to change the time interval only when the total length of all the chains rooted in the active M-list is approximately equal to the length of the S-chain. This strategy puts a cache line through three different phases: In the first phase following its most recent access, while part of an M-chain, it is immune from paging. In the next phase, while in the top half of the S-chain, the probability that it will be paged out is strongly determined by the number of times it has been accessed since it was initially paged in. In the third phase, in the bottom half of the S-chain, it will certainly be paged out unless it is re-accessed within a relatively short time period.

In any event, the disclosed procedure enables all lines that are accessed during any time interval to be retained in the cache long enough to give them a chance to be re-accessed and simultaneously retains frequently accessed lines for longer periods, even when the interval between successive accesses can at times be relatively large. In addition, it enables lines to be assembled into pages based on a more complete measure of their associated access patterns.

Three routines are used to maintain the aforementioned lists while cache lines are being accessed and other lines are being identified for removal from the cache memory. These routines could be implemented in hardware, firmware or software. One routine, called the "access-response routine", is invoked following each cache line access and is used to reflect the changes in the S-list entry associated with the accessed line. A second routine, called the "merge routine", is invoked following the end of each time interval in order to link all M-chains generated during that time interval go back into the S-chain. A third routine, called the "extraction routine", is used to extract the bottom entries from the S-chain, thereby identifying lines to be assembled into a page for removal from the cache when room is needed to page in new cache lines.

Figure 3:
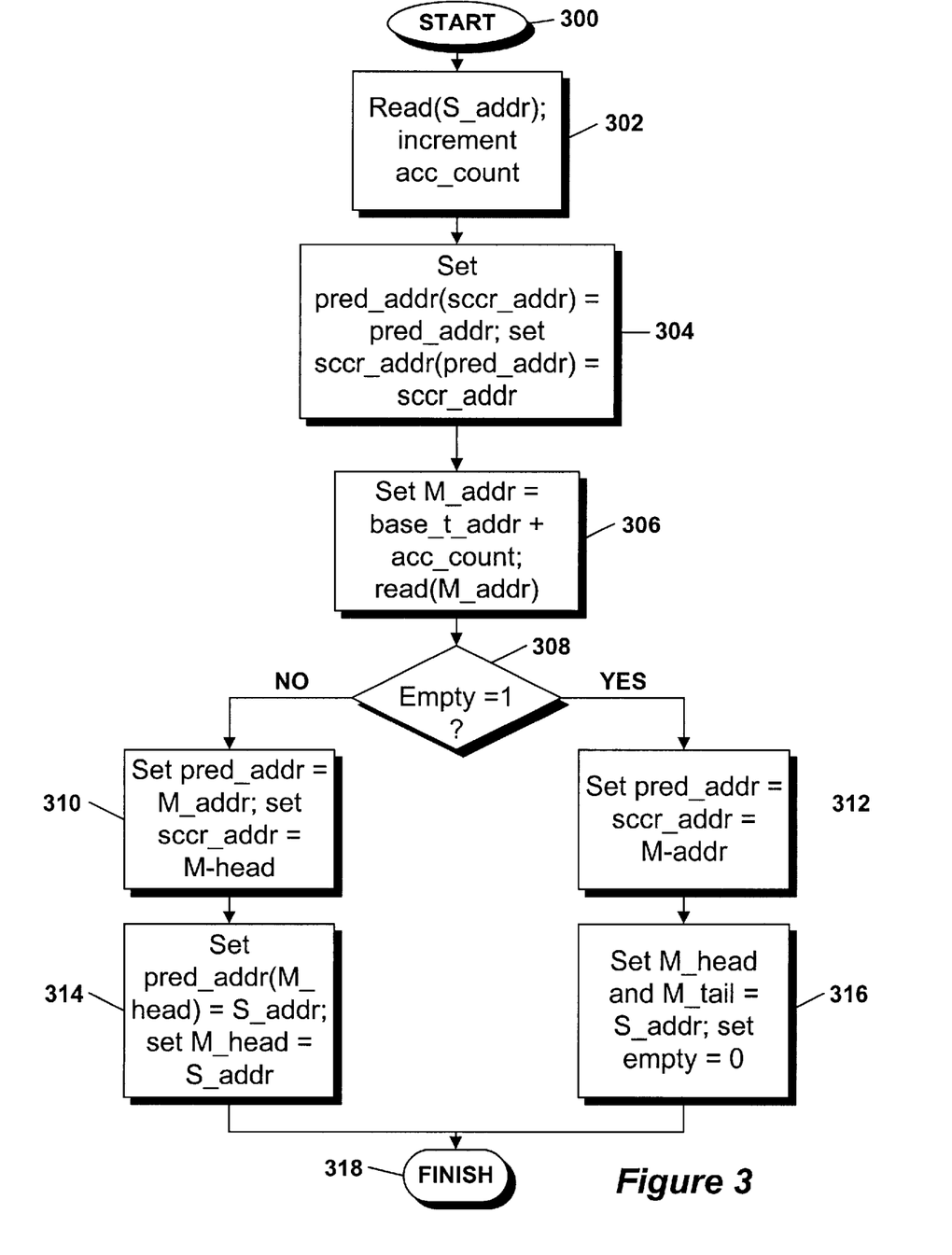
FIG. 3 is a flowchart illustrating the steps in an access response routine that is invoked following each cache access to reflect the changes in entries in the ordered linked list associated with the accessed line process and for inserting a new entry into a linked list of stored metrics.
Figure 4:
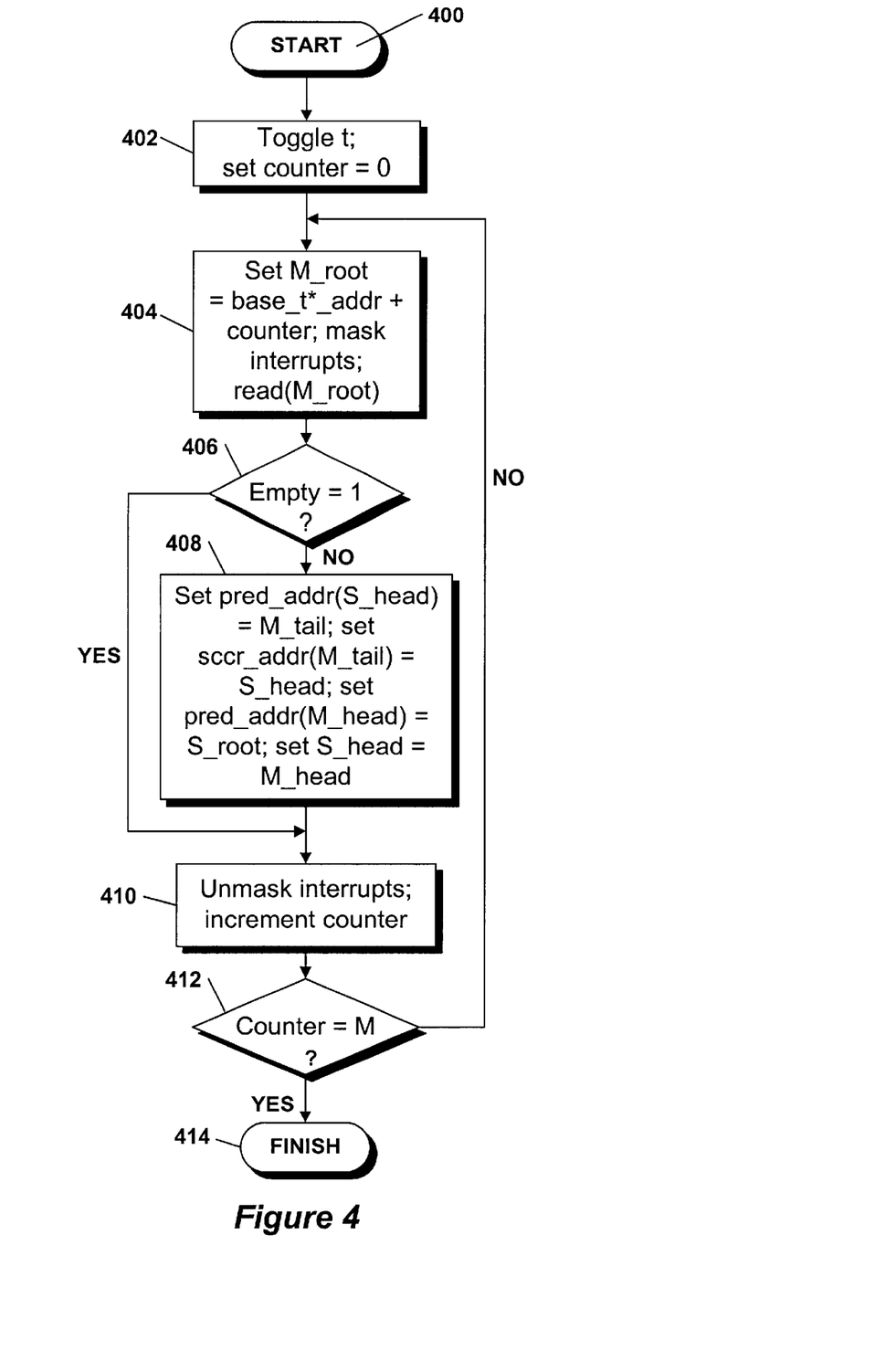
FIG. 4 is a flowchart illustrating the steps in a merge routine that is invoked following the expiration of each time interval to link all sub-chains generated during the preceding interval back into the ordered linked list.
Figure 5:
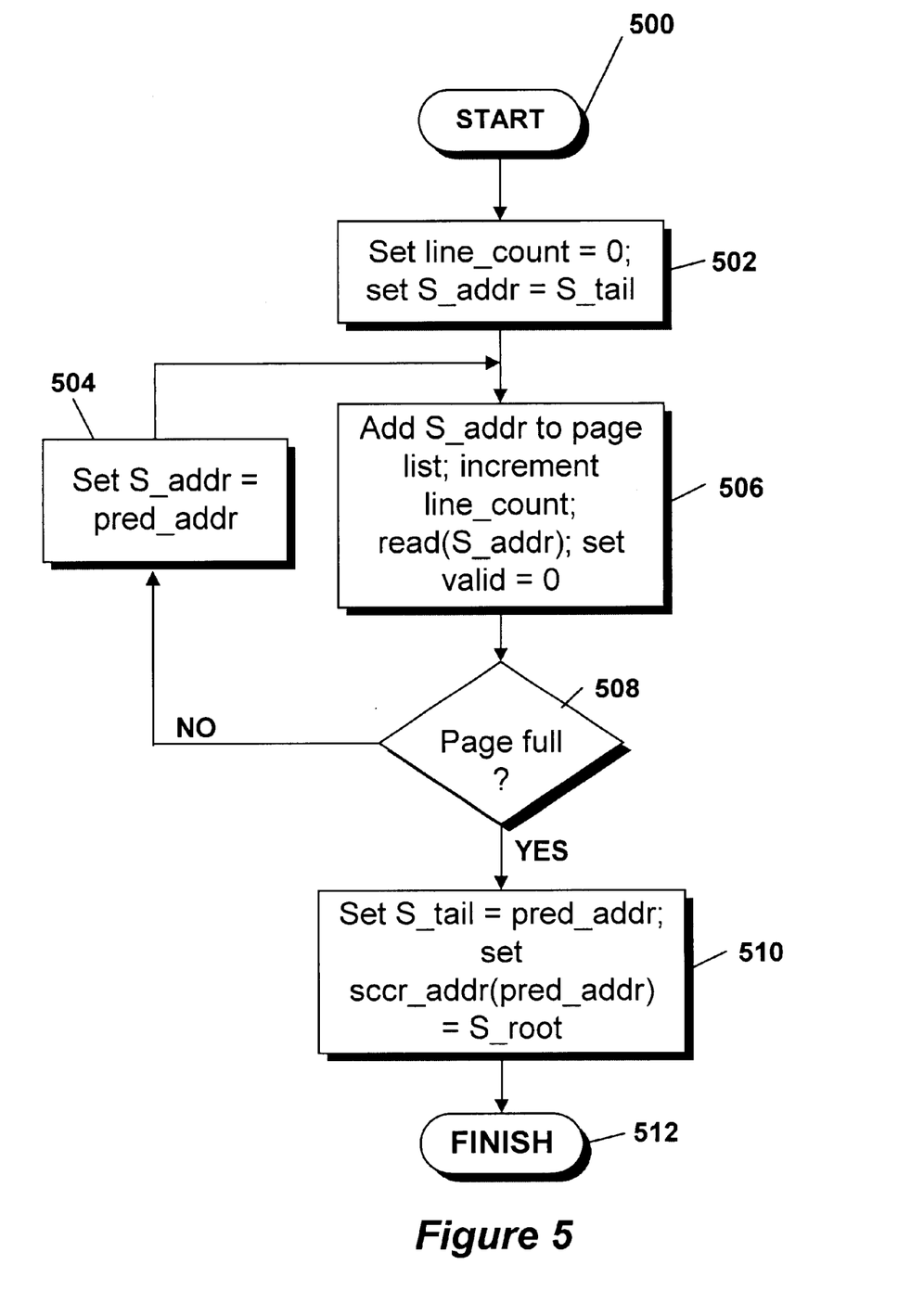
FIG. 5 is a flowchart illustrating the steps in an extraction routine that extracts links from the ordered linked list in order to identify lines to be assembled into a page for removal from the cache when room is needed to page in new cache lines

These routines are described using the flowcharts shown in FIGS. 3 through 5. In order to simplify the narrative in those flowcharts, the following notation is used: whenever a reference is made to a pred_addr or a sccr_addr without further qualification, the address referred to is that in the last explicitly read S-list entry. Similarly, when a reference is made to an M_head or an M_tail, the referenced address is that in the last explicitly read M-list entry. When this is not the case, the entry containing the address of interest is explicitly indicated. For example, pred_addr(M-head) denotes the predecessor address in the S-list entry pointed to by the address of the head of the chain rooted in the last explicitly read M-list entry. In addition, sccr_addr(X) is interpreted as M_head if X is the address of an M-list entry and as S_head if it is the address of the S-root. Similarly, pred_addr(X) is interpreted as M_tail if X is the address of an M-link entry and as S_tail if it is the S-root address. Finally, the binary variable t used in the flowcharts reflects the time interval with t=0 during even numbered intervals and t=1 during odd numbered intervals.

A flowchart outlining the access-response-routine steps taken in response to each cache line access is shown in FIG. 3. The routine starts in step 300 and, proceeds to step 302 where the S-list entry at the S_addr corresponding to the cache line just accessed is read and its metric (access count) incremented to reflect the additional access. In step 304, the updated S-list entry is then de-linked from its current M-chain or S-chain linked list by manipulating the pointers of the preceding and succeeding entries in the linked list. In particular, de-linking is accomplished by replacing the successor address of the entry's predecessor in the list with its own successor address and replacing the predecessor address of its successor in the list with its own predecessor address.

Next, in step 306, the address of the M-list entry corresponding to the new access count is constructed by combining the access count with the relevant base address, base_t_addr, with t determined by the current time interval. The entry at that address is then read.

In step 308, the empty value in M-list entry is checked to determine if any other S-list entries are already linked to the M-list entry. If none are, the process proceeds to step 312 where the updated S-list entry is linked to the M-list entry just read by setting both the predecessor and successor S-list addresses to the M-list entry address indicating that the S-list entry is the sole entry on that M-list. In addition, in step 316, both the head address and the tail address in the M-list entry are set to the S-list address (S_addr) of the updated S-list entry. The empty bit is set to indicate that the M-list is no longer empty and the routine finishes in step 318.

Alternatively, if the linked list represented by the M-list entry is not empty as determined in step 308, the updated S-list entry is placed at the head of the M-list in step 310 by setting the predecessor address of the S-list entry to the address of the M-list entry and by setting the successor address of the S-list entry to the address of the current head of the M-list contained in the M-head value.

Next, in step 314, the linkage is completed by changing the predecessor address of the S-list entry pointed to by the M-list current head address to the address of the updated S-list entry and then changing the M-list head address (M-head) to that address as well.

At the end of each time interval, the roles of the M0-list and M1-list are reversed the list that served as the root for all newly-accessed S-list entries (the active M-list), passes that role to the inactive M-list. Following that transition, all of the M-chains associated with the now inactive M-list are merged with the S-chain by means of the merge routine shown in FIG. 4. This routine starts in step 400 and proceeds to step 402 where the routine is initialized by toggling the binary variable t which is used to identify which of the M-lists is currently the active M-list. In addition, a counter variable is set to the value "0", representing the smallest possible metric.

An M-list address is then defined in step 404 by adding the counter variable value to the base address (base_t*_addr, with t* the complement of t) corresponding to the newly inactive M-list. As discussed below, in order to prevent the routine from being interrupted during the update of the S-list, interrupts are masked in a conventional fashion. The M-list entry at the calculated address is then read.

If the entry is empty, as determined by examining the empty bit in step 406, the routine proceeds to step 410 where the interrupts are unmasked and the counter variable is incremented.

Whenever a non-empty entry is found in step 406, the routine proceeds to step 408 where the M-chain corresponding to the non-empty entry is connected to the top of the S-chain by (1) setting the predecessor address in the S-list entry identified by the current head address of the S-chain (stored in S_head) to the tail address of the current M-chain (M_tail), (2) setting the successor address in the S-list entry identified by the tail address of the M-chain (M-tail) to the address of the S-chain head, (3) setting the predecessor address in the S-list entry identified by the head of the M-chain to the address of the S-chain head and (4) setting the S-chain head address to the M-chain head address. The routine then proceeds to step 410 where the interrupts are unmasked and the counter variable is incremented.

Next, in step 412, a determination is made whether the counter had reached its maximum allowed value before being incremented, if not, the procedure returns to step 404 where the counter variable is incremented and next M-list entry is read. Steps 406, 408 and 410 are then repeated.

Since the merge routine can take a significant period of time to complete and is less time-critical than the other two routines, it will typically run in background mode at a lower priority than the other two. The only precaution that must be taken is to prevent the merge routine from being interrupted when it is in the midst of merging a given M-chain into the S-chain, since, if it were interrupted, the head or the tail of that chain could be changed before the merge is completed and the chain could be broken. To prevent this from happening interrupts need to be masked during each M-chain merge operation, as shown in FIG. 4. This is accomplished by setting the interrupt mask in step 404, just before the M-list entry is examined and resetting it in step 410 as soon as the merge has been completed. The routine can be interrupted at any point outside this protected region with impunity.

The extraction routine steps taken to identify the lines to be paged out to as make room for a new page are illustrated in the flowchart in FIG. 5. This routine starts in step 500 and proceeds to step 502 where a line_count variable is initialized to zero and the first cache line to be paged out is selected. This latter line is identified by the S-list entry address pointed to by the S-chain tail address.

In step 506, this address is added as the first address to a page list that includes lines to be paged out, the line_count variable is incremented to record the fact that an address has been added to the page list. Then the S-list entry at the address is read and the valid bit reset to indicate that the associated cache line is now empty.

In step 508, the line_count variable is checked to determine if enough lines have been identified to fill a cache page. If not, the process proceeds to step 504 where the address of the predecessor of the S-list entry being processed is identified and the routine returns to step 506 to process the newly identified S-list entry.

If, in step 508, it is determined that a sufficient number of lines have been identified to fill a cache page, then the routine proceeds to step 510 where the address of the tail of the S-chain is equated to the address of the predecessor of the S-list entry corresponding to the last line selected and the successor address at that address is set to the address of the S-chain root. These latter two operations trim the paged out entries from the S-list.

Neither the access-response routine illustrated in FIG. 3 nor the extraction routine illustrated in FIG. 5 can be safely interrupted by the other routine or by the merge routine illustrated in FIG. 4. Consequently, they must be run at relatively high priority and with lower-priority interrupts masked. This should not pose any performance problems, however, since both routines access only a small number of S-list entries and can thus be executed in their entirety in a very short period of time.

Metrics other than the number of accesses to a cache line since the line was brought into the cache memory are obviously possible and can be readily accommodated using the structures and routines just described. The only change in the flowcharts in FIGS. 3–5 needed in order to operate with a different metric is that shown in step 302. Rather than incrementing the associated metric on each new cache line access, some other operation would be implemented that was appropriate to the metric being used.

A metric that might be preferable under some circumstances to the access-count metric is one that includes a time stamp as well as an access count. This would allow the amount by which the metric is incremented, or decremented, on each cache line access to be made a function of the elapsed time since its last access. Subsequent accesses to lines that were only recently accessed, for example, might be incremented by one or more units, depending on how recently they were accessed, whereas the metric associated with more distant accesses might be decremented. This additional degree of freedom enables a somewhat more flexible level of filtering to take place with the cache lines selected for paging based even more directly on the relative frequency with which they are accessed.

The best metric and the best time interval to use in any given circumstance depend on several parameters including the number of lines in the cache, the frequency with which they are accessed and the access patterns for the application of interest. Regardless of the metric and the interval chosen, however, the disclosed procedure provides a means for grouping and paging cache lines based on a time-weighted value of that metric and hence provides a means for tailoring these operations dynamically to the application environment.

A software implementation of the above-described embodiment may comprise a series of computer instructions either fixed on a tangible medium, such as a computer readable medium, e.g. a diskette, a CD-ROM, a ROM memory, or a fixed disk, or transmissible to a computer system, via a modem or other interface device over a medium. The medium either can be a tangible medium, including, but not limited to, optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, although the description was directed to a particular hardware system and operating system, other hardware and operating system software could be used in the same manner as that described. Other aspects, such as the specific instructions utilized to achieve a particular function, as well as other modifications to the inventive concept are intended to be covered by the appended claims.

What is claimed is:

1. A method for use in a computer system in which cache lines in a cache memory are transferred in a multi-line page between the cache memory and an underlying storage, the method determining which cache lines to group in a page for removal from the cache memory in order to make room for new data and comprising:

(a) associating a metric having a value with each cache line in a page when the page is brought into the cache memory;

(b) changing a value of a metric each time the associated cache line is accessed by the computer system;

(c) repeatedly arranging metrics in a chain in which metric values are ordered first by a time duration during which associated cache lines were last accessed and then by the value of the metric; and (d) using sequential metric values from the chain to select cache lines in order to build a page for removal from the cache memory.

2. The method of claim 1 wherein the chain comprises a connected set of metric sub-chains, the sub-chains being linked in order of a time duration in which cache lines associated with metrics in each sub-chain were last accessed and metrics within each sub-chain being ordered in accordance with their associated metric values.

3. The method of claim 2 wherein each of the sub-chains comprises a linked list of metrics having a same metric value.

4. The method of claim 2 further comprising (e) defining sequential time intervals and wherein step (c) comprises assembling a set of sub-chains during each time interval and, at the end of the time interval, linking the assembled set of sub-chains together.

5. The method of claim 4 wherein the chain has a length and wherein each time interval ends when a combined length of the sub-chains assembled during that time interval substantially equals the chain length.

6. The method of claim 1 wherein step (a) comprises associating a metric having a value equal to a number of times the associated cache line has been accessed since being brought into the cache memory.

7. The method of claim 6 wherein step (b) comprises incrementing the value of the metric each time the associated cache line is accessed by the computer system.

8. The method of claim 1 wherein the chain comprises a doubly linked list.

9. The method of claim 1 wherein each cache line has an address in the cache memory and wherein step (a) comprises storing the metrics in a data structure in which a metric associated with a cache line is accessed in the data structure using the address of the cache line in the cache memory.

10. The method of claim 9 wherein each metric is stored in an entry in the data structure and the chain is formed by linking entries in the data structure using the addresses.

11. The method of claim 10 wherein the chain has a head and a tail and wherein the method further comprises (f) storing an entry address of the head and an entry address of the tail in another data structure.

12. Apparatus for use in a computer system in which cache lines in a cache memory are transferred in a multi-line page between the cache memory and an underlying storage, the apparatus determining which cache lines to group in a page for removal from the cache memory in order to make room for new data and comprising:

a structure that associates a metric having a value with each cache line in a page when the page is brought into the cache memory;

an access-response mechanism that changes a value of a metric each time an associated cache line is accessed by the computer system;

a merge mechanism that repeatedly arranges metrics in a chain in which metric values are ordered first by a time duration during which associated cache lines were last accessed and then by the value of the metric; and an extraction mechanism that uses sequential metric values from the chain to select cache lines in order to build a page for removal from the cache memory.

13. The apparatus of claim 12 wherein the chain comprises a connected set of sub-chains, the sub-chains being linked in order of a time duration in which associated cache lines were last accessed and metrics within each sub-chain being ordered in accordance with their associated metric values.

14. The apparatus of claim 13 wherein each of the sub-chains comprises a linked list of metrics having a same metric value.

15. The apparatus of claim 13 further comprising a timing mechanism that defines sequential time intervals and wherein the merge mechanism comprises an M-list for assembling a set of sub-chains during each time interval and a mechanism, operable at the end of the time interval, that links the assembled set of sub-chains together.

16. The apparatus of claim 15 wherein the chain has a length and wherein each time interval ends when a combined length of the sub-chains assembled during that time interval substantially equals the chain length.

17. The apparatus of claim 12 wherein the structure associates a metric having a value equal to a number of times an associated cache line has been accessed since being brought into the cache memory.

18. The apparatus of claim 17 wherein the access-response mechanism comprises a counter that increments a value of a metric each time an associated cache line is accessed by the computer system.

19. The apparatus of claim 12 wherein the chain comprises a doubly linked list.

20. The apparatus of claim 12 wherein each cache line has an address in the cache memory and wherein the structure comprises a data structure in which metrics are stored and in which a metric associated with a cache line is accessed in the data structure using an address of the cache line in the cache memory.

21. The apparatus of claim 20 wherein each metric is stored in an entry in the data structure and the chain is formed by linking entries in the data structure using the addresses.

22. The apparatus of claim 21 wherein the chain has a head and a tail and the apparatus further comprises another data structure that stores an entry address of the head and an entry address of the tail.

23. A computer program product for use in a computer system in which cache lines in a cache memory are transferred in a multi-line page between the cache memory and an underlying storage, a method determining which cache lines to group in a page for removal from the cache memory in order to make room for new data, the computer program product comprising a computer usable medium having computer readable program code thereon, including:

program code that associates a metric having a value with each cache line in a page when the page is brought into the cache memory;

program code that changes a value of a metric each time the associated cache line is accessed by the computer system;

program code that repeatedly arranges metrics in a chain in which metric values are ordered first by a time duration during which associated cache lines were last accessed and then by the value of the metric; and program code that uses sequential metric values from the chain to select cache lines in order to build a page for removal from the cache memory.

24. The computer program product of claim 23 wherein the chain comprises a connected set of metric sub-chains, the sub-chains being linked in order of a time duration in which cache lines associated with metrics in each sub-chain were last accessed and metrics within each sub-chain being ordered in accordance with their associated metric values.

25. The computer program product of claim 24 wherein each of the sub-chains comprises a linked list of metrics having a same metric value.

26. The computer program product of claim 24 further comprising program code that defines sequential time intervals and wherein the program code that arranges metrics in a chain comprises program code that assembles a set of sub-chains during each time interval and, at the end of the time interval, links the assembled set of sub-chains together.

27. The computer program product of claim 26 wherein the chain has a length and wherein each time interval ends when a combined length of the sub-chains assembled during that time interval substantially equals the chain length.

28. The computer program product of claim 23 wherein the program code that associates a metric with each cache line comprises program code that associates a metric having a value equal to a number of times the associated cache line has been accessed since being brought into the cache memory.

29. The computer program product of claim 28 wherein the program code that recomputes a value of a metric each time the associated cache line is accessed by the computer system comprises program code that increments the value of the metric each time the associated cache line is accessed by the computer system.

30. A computer data signal embodied in a carrier wave for use in a computer system in which cache lines in a cache memory are transferred in a multi-line page between the cache memory and an underlying storage, a method determining which cache lines to group in a page for removal from the cache memory in order to make room for new data, the computer data signal comprising:

program code that associates a metric having a value with each cache line in a page when the page is brought into the cache memory;

program code that changes a value of a metric each time the associated cache line is accessed by the computer system;

program code that repeatedly arranges metrics in a chain in which metric values are ordered first by a time duration during which associated cache lines were last accessed and then by the value of the metric; and program code that uses sequential metric values from the chain to select cache lines in order to build a page for removal from the cache memory.

* * * * *